(12) United States Patent
Chiang (10) Patent No.: US 7,319,995 B2
(45) Date of Patent: *Jan. 15, 2008

(54) METHOD AND SYSTEM FOR INCLUSION HASH JOINS AND EXCLUSION HASH JOINS IN RELATIONAL DATABASES

(75) Inventor: Kuorong Chiang, Cerritos, CA (US)

(73) Assignee: NCR Corp., Dayton, OH (US)

( * ) Notice: Subject to any disclaimer, the term of this patent is extended or adjusted under 35 U.S.C. 154(b) by 445 days.

This patent is subject to a terminal disclaimer.

(21) Appl. No.: 10/918,534

(22) Filed: Aug. 12, 2004

(65) Prior Publication Data

US 2005/0021503 A1   Jan. 27, 2005

Related U.S. Application Data

(63) Continuation of application No. 09/864,824, filed on May 24, 2001, now Pat. No. 6,834,279.

(51) Int. Cl.
  *G06F 17/30* (2006.01)

(52) U.S. Cl. .............................. 707/2; 707/4; 707/104.1

(58) Field of Classification Search .................... 707/2, 707/4, 102, 104.1
See application file for complete search history.

(56) References Cited

U.S. PATENT DOCUMENTS

| | | | | |
|---|---|---|---|---|
| 5,706,495 | A * | 1/1998 | Chadha et al. | 707/2 |
| 5,864,842 | A * | 1/1999 | Pederson et al. | 707/3 |
| 6,081,801 | A * | 6/2000 | Cochrane et al. | 707/3 |
| 6,134,546 | A * | 10/2000 | Bestgen et al. | 707/4 |
| 6,253,197 | B1 * | 6/2001 | Lindsay et al. | 707/3 |
| 6,263,331 | B1 * | 7/2001 | Liu et al. | 707/4 |
| 6,341,281 | B1 * | 1/2002 | MacNicol et al. | 707/3 |
| 6,505,188 | B1 * | 1/2003 | Ghazal et al. | 707/2 |
| 6,516,310 | B2 * | 2/2003 | Paulley | 707/2 |
| 6,594,651 | B2 * | 7/2003 | Kabra et al. | 707/2 |
| 6,618,729 | B1 * | 9/2003 | Bhashyam et al. | 707/101 |

* cited by examiner

*Primary Examiner*—Leslie Wong
(74) *Attorney, Agent, or Firm*—Howard Speight (57) ABSTRACT

A method, system and apparatus for performing an inclusion hash join and an exclusion hash join using a hash join are provided. The inner and outer tables are transposed to left and right tables, respectively. A hash table is created from the left table, the right table is scanned, and the hash table is probed. If the right table hash value matches a hash table value, the actual values are compared. If they match, the current outer table row is included in the result. If an exclusion condition is present, the hash table is probed with the right-table-row's hash value. If no hash values match, the outer table row is added to the result and the next row is addressed. If one or more hash values match, the actual values are compared.

10 Claims, 7 Drawing Sheets

| 400 | Hash Join Mechanism |
|---|---|
| 402 | Left Table |
| 404 | Right Table |
| 406 | Hash Algorithm |
| 408 | Hash Table |
| 410 | Compare Operator |
| 412 | Scanning |
| 414 | Probing |

METHOD AND SYSTEM FOR INCLUSION HASH JOINS AND EXCLUSION HASH JOINS IN RELATIONAL DATABASES

CROSS REFERENCE TO RELATED APPLICATION

This application is a continuation of U.S. patent application Ser. No. 09/864,824 which was filed on May 24, 2001 now U.S. Pat. No. 6,834,279 in the name of the same inventor and assigned to the same entity as the present application and a claim of priority to that application is herein made.

BACKGROUND

Structured Query Language (SQL) is a standardized language for accessing and updating relational databases. The American National Standards Institute (ANSI) and the International Standards Organization (ISO) published the first standard in 1986. The current standard is SQL-99.

SQL provides a mechanism for creating tables, each of which contains rows and columns of information that are collectively assembled into a database. Ideally, the tables are "normalized" in that the structure of the tables avoids data redundancy and allows the resulting data model to be mapped to many different physical database designs. In order to avoid redundancy, yet still be able to display data from multiple tables, SQL provides a mechanism called a join. There are many types of joins that provide various results. Some types of joining, however, have some important performance and cost implications.

Once multiple tables are involved, performance can be affected significantly by the execution plan (i.e., in the specific way the tables are joined). Join performance is much more acute when the tables are large, such as in data warehouse applications. The quest for performance has encouraged optimization of joining techniques and the development of the sort merge join, the nested loops join, and the hash join.

Hashing translates an index, or a join-column value, to an offset and then to a database address. If a row needs to be selected on the basis of a supplied index value, it can be done by converting the index through a hash algorithm, to an offset that can then be added to the "row identifier" of the first row to provide the address of the block where the information is stored. Thus, a row can be identified through the key value without applying an index and without having to perform a full table scan. This mechanism can be used in a hash cluster, which contains rows with the same hash value. In certain circumstances, hash clusters can provide considerable performance advantages over indexing.

In situations where the SQL query contains an inclusion or exclusion condition (i.e., an "IN" or "NOT IN" condition, respectively), a merge-join is normally performed. Typically, the merge-join requires two full table scans and a sort operation. Such sort operations typically require significant resources and add significantly to the cost of the operation. Employing a hash join would reduce the resources necessary to perform such an operation. There is, therefor, a need in the art for a hash join method that allows for inclusion/exclusion conditions in the SQL statement.

SUMMARY

The invention overcomes the above-identified problems as well as other shortcomings and deficiencies of existing technologies by providing a method of including inclusion and exclusion conditionals in a hash join that consumes fewer resources than traditional merge-joins.

Accordingly, an exemplary embodiment of the invention is directed to a method for performing inclusion and exclusion hash joins. The method enables the joining of an inner table and an outer table in a database in response to a SQL statement having an inclusion or exclusion operator.

In general, the method of the present invention relates to joining an inner table and an outer table in a database in response to a query statement having an inclusion operator. The method first transposes (swaps) the inner and the outer tables to form left and right tables, respectively. The swapping of tables enables the utilization of existing (optimized) join modules. Thereafter, a hash table is created from the left table. Then, the rows of the right table are scanned and compared (probed) to the values in the hash table. If a right table hash value matches a value in the hash table, then the actual values of the respective rows are evaluated for the join condition and, if satisfied, that outer table row is included in the result. Because the hash match is a necessary—but not sufficient—condition for the outer row to be qualified, the additional step of evaluating the join, namely a check to determine if the join column value from the outer and inner rows also match, must be performed before the row is included in the result. Typically, the comparison process proceeds one row at a time. However, the method of the present invention is amenable to parallelization, with processing occurring one row at a time for each of the parallel processors.

Yet another alternate embodiment of the method of the present invention relates to joining an inner table and an outer table in a database in response to a query statement having an exclusion operator. As before, the method of the present invention first transposes (swaps) the inner and the outer tables to form left and right tables, respectively. A hash table is created from the left table. Then, the rows of the right table are scanned and compared (probed) to the values in the hash table. In the case of the exclusion hash join of the present invention, if the hash value from the outer table is found not to be equivalent to any value in the hash table, then the row from the outer table (which is already on hand because it was used to calculate the outer hash table value) can be included immediately in the join result and further processing for that right table row can stop, again conserving system resources. Quick termination as provided by the present invention results in considerable savings in both time, memory requirements, and computing capacity. If one or more values in the hash table match the hash value from the right table, then the corresponding rows of the outer table must be evaluated for the join condition. Only if the join conditions are satisfied is the outer row excluded from the result. Otherwise, processing continues for the other rows of the right table. Thus, for the exclusion join situation, the outer row will have to be paired (compared) to all of the inner rows with the same hash and, if no match is found, only then would that outer row be included in the result. Typically the comparison process proceeds one row at a time although this process is amenable to parallel processing, with each processor proceeding one row at a time.

The method of the present invention can be implemented on a database system having a database with, typically, two tables for responding to SQL statements that designate an outer table and an inner table within the database. Alternatively, one physical table can be used and referenced twice, first as the outer table, and then again as the inner table. The database system itself consists of system memory that is capable of storing a hash table and perhaps other database-related parameters. In addition, the database system has at least one processor that is operative with the system memory. The processor is used to generate a hash table from the one of the tables. The processor is also used to scan the other table (which may be empty, e.g., have zero records) in order to generate an hash value that can then be compared the hash values in the hash table to determine whether or not an inclusion or an exclusion condition is satisfied. Those outer table rows satisfying the inclusion/exclusion condition are appended to a result.

Features and advantages of the invention will be apparent from the following description of the embodiments, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed; on the contrary, the intention is to cover all modifications, equivalents, and alternatives falling within the spirit and scope of the invention as defined by the appended claims.

DETAILED DESCRIPTION

The present invention is a method, system and apparatus for performing inclusion and exclusion hash joins that consume fewer resources than alternate join mechanisms.

Figure 1:
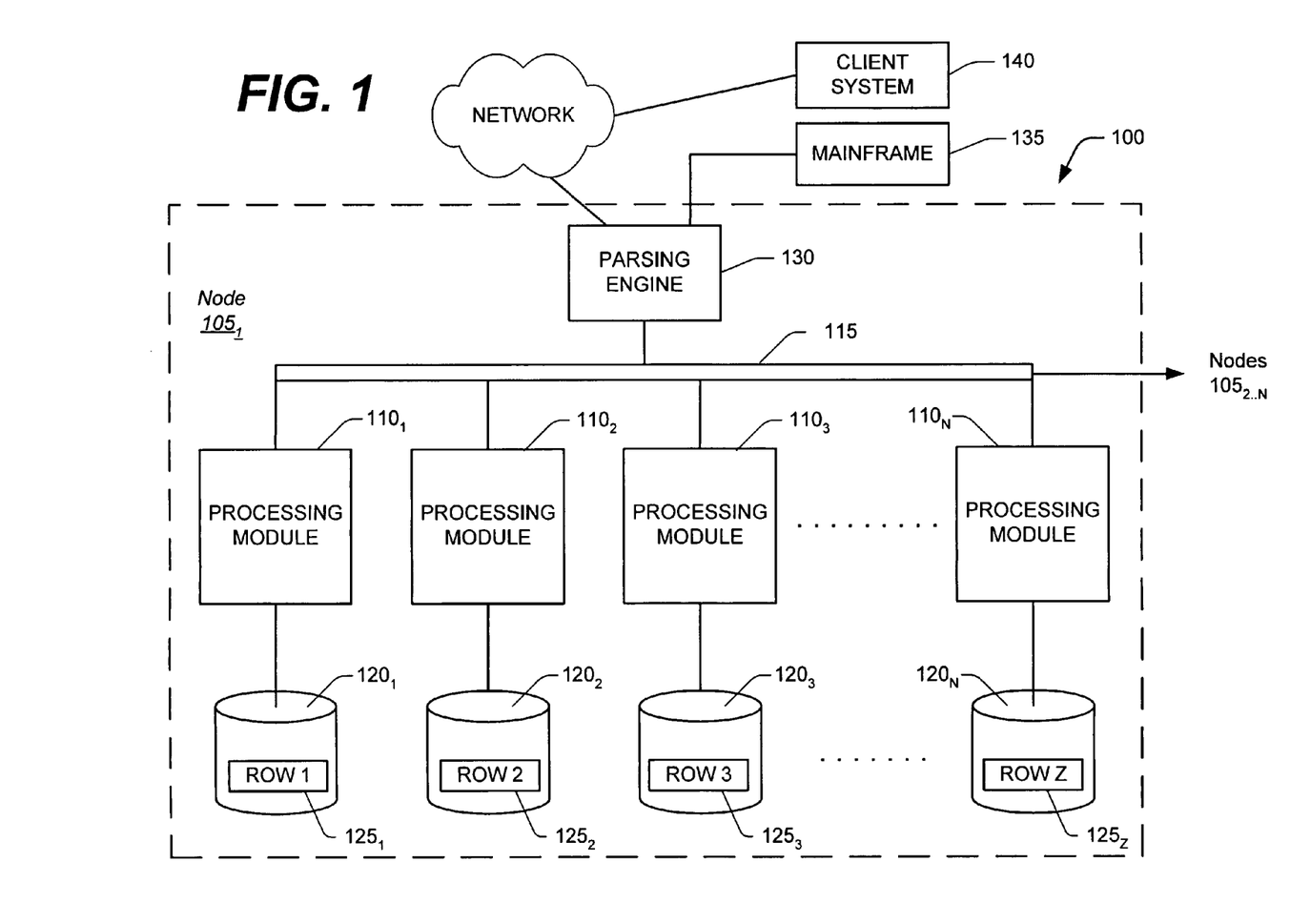
FIG. 1 is a block diagram of a node of a database system of the present invention.

The method of the present invention has particular application to large databases which might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on a M-processor node, the node's operating system schedules the N virtual processors to run lesser number of physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. In one aspect of the present invention, the parsing engine does not actually work on the data; instead, it generate executable code for the virtual processors that do the actual work on the data. The DBS 100 usually receives queries in a standard format, such as SQL.

Figure 2:
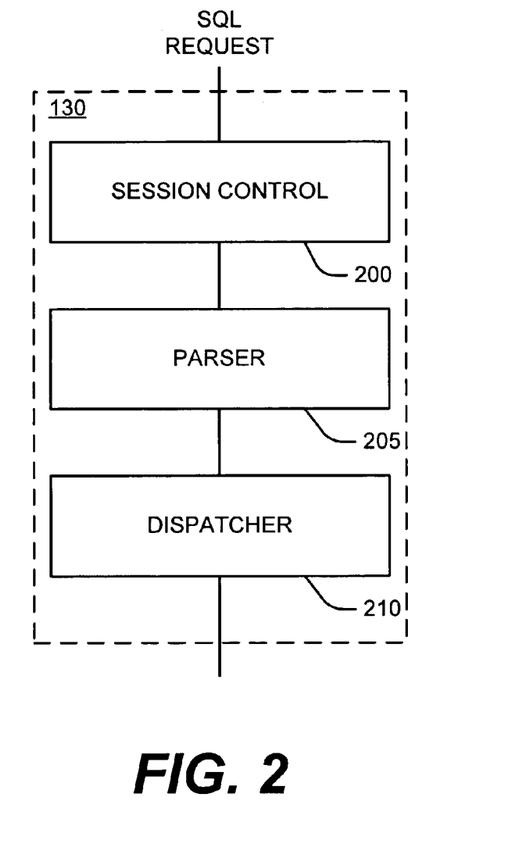
FIG. 2 is a block diagram of a parsing engine of the present invention.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
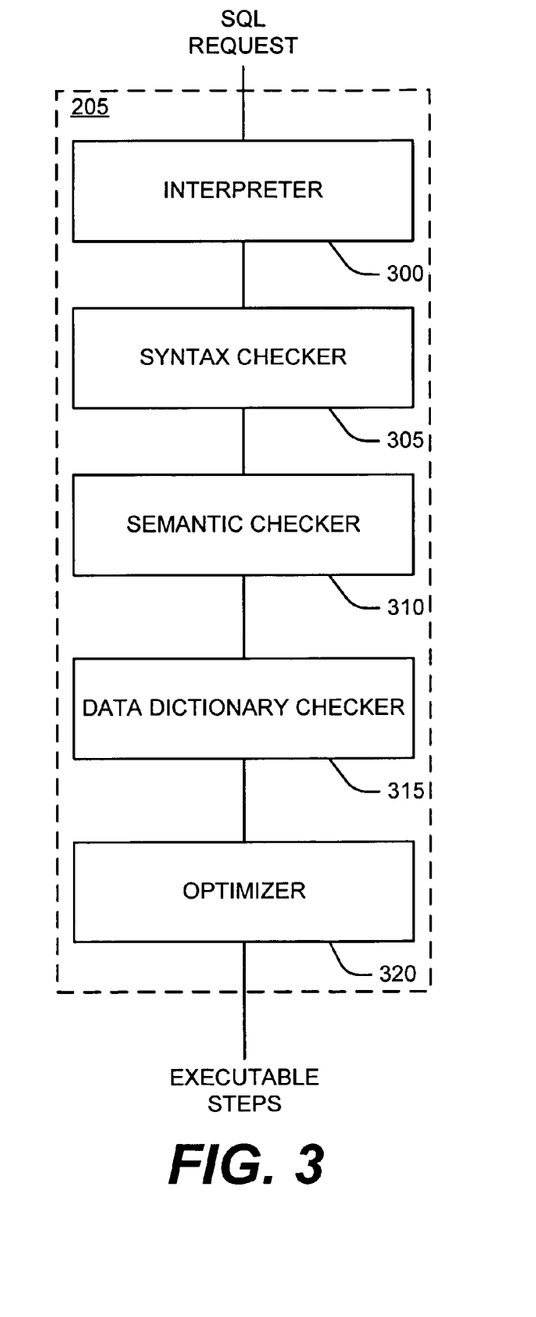
FIG. 3 is flow chart of a parser of the present invention.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request. In the present invention, the optimizer recognizes inclusion/exclusion merger join and replaces them with inclusion/exclusion hash join, respectively, where spooling and/or sorting are necessary. Alternatively, a "cost model" can be developed and utilized that allow for independent selection of the merge join or the hash join based on spooling/sorting and/or other criteria.

In the classic hash join, a hash algorithm is used to generate a hash table from the left table. The hash table is an in-memory copy of all of the left table rows. All rows with the same hash value are stored in a single list. Given a hash from the right table, one can directly retrieve the specific list. While a hash algorithm or hashing function is necessary, any suitable hashing algorithm/function can be used to obtain a hash value from a true value (from the right row). However, to obtain the list (i.e., the probe), no special algorithm is necessary. The right table is then scanned. During the scanning of the right table, a hash value of each right table row is made, based upon the same hashing algorithm/function. The hash value from the right table is used to "probe" (meaning to directly obtain the list of rows with the same has, if existent). The list is then sequentially searched to determine if the hash values match (e.g., the hash values are equivalent). All of the rows with the same hash values in the left table are typically linked together in a link list at the time the hash table is created. This technique is a useful replacement for merge-joins because it eliminates the need for time-consuming sorting of the input left and right tables.

Inclusion/exclusion ("IN"/"NOT IN") conditions in a SQL statement are not unusual. For the purpose of this disclosure, the terms "inner" and "outer" are relative to the subquery of a SQL statement having an inclusion/exclusion condition. For example in a query "SELECT t1.x, t1.y FROM t1 where t1.x IN (SELECT t2.y from t2)," then t1 is the outer table as it is outside of the subquery. T2, in this case, is the inner table as it is inside the subquery. The terms "left" and "right" refer to the two tables in the join algorithm itself, rather than whether that particular table is the inner table or the outer table. Incidentally, either (or both) of the tables may be empty (e.g., have zero records).

In the present invention, two tables are required to be joined by an SQL statement due to an inclusion/exclusion condition. The columns that join the tables are called the hash key. The result of implementing the hash function on the hash key is called the hash value. Specifically, the hash function h is used to hash tuples of both relations on the basis of join attributes. The hash table itself consists of, for example, linked lists called hash buckets, and limits the number of pairs of tuples that must be compared. However, a comparison (probe) must still be performed when the hash values from both tables are equivalent (i.e., h(left)=h(right)). Thus, in one scenario, the hash value must be calculated for each of the rows in the right table. In an alternate embodiment, the hash value is stored in the "row header" that is associated with a physical row, so that the hash value is simply obtained as a pre-calculated value. Calculation or retrieval of the hash from the right table rows is always necessary because all of the hash values from the right table rows are needed. It will be understood that other embodiments of the present invention can have different mechanisms for performing this portion of the hash join without departing from the scope and spirit of the claims.

In the case of the hash join of the present invention, the inner table rows are copied into the hash table and the outer table rows are scanned. In those situations where the "IN" or "NOT IN" operators are part of the SQL statement, the combination of results in a true/false condition that must be satisfied in order for the left table record to be included in the join result file. It is important to note that, in the inclusion hash join of the present invention, if the hash value from the outer table is found to be equivalent to any value in the hash table (obtained from the rows of the inner table), then the row from the outer table (which is already on hand because it was used to calculate the outer hash table value) must be evaluated to ensure that the actual values match and, if so, be included immediately in the join result file so that further processing for that inner table row can stop, thereby conserving system resources. Similarly, in the exclusion hash join of the present invention, if the hash value from the outer table is found not to be equivalent to any value in the hash table, then the row from the outer table (which is already on hand because it was used to calculate the outer hash table value) can be included immediately in the join result and further processing for that right table row can stop, again conserving system resources. Quick termination as provided by the present invention results in considerable savings in both time, memory requirements, and computing capacity.

Figure 4:
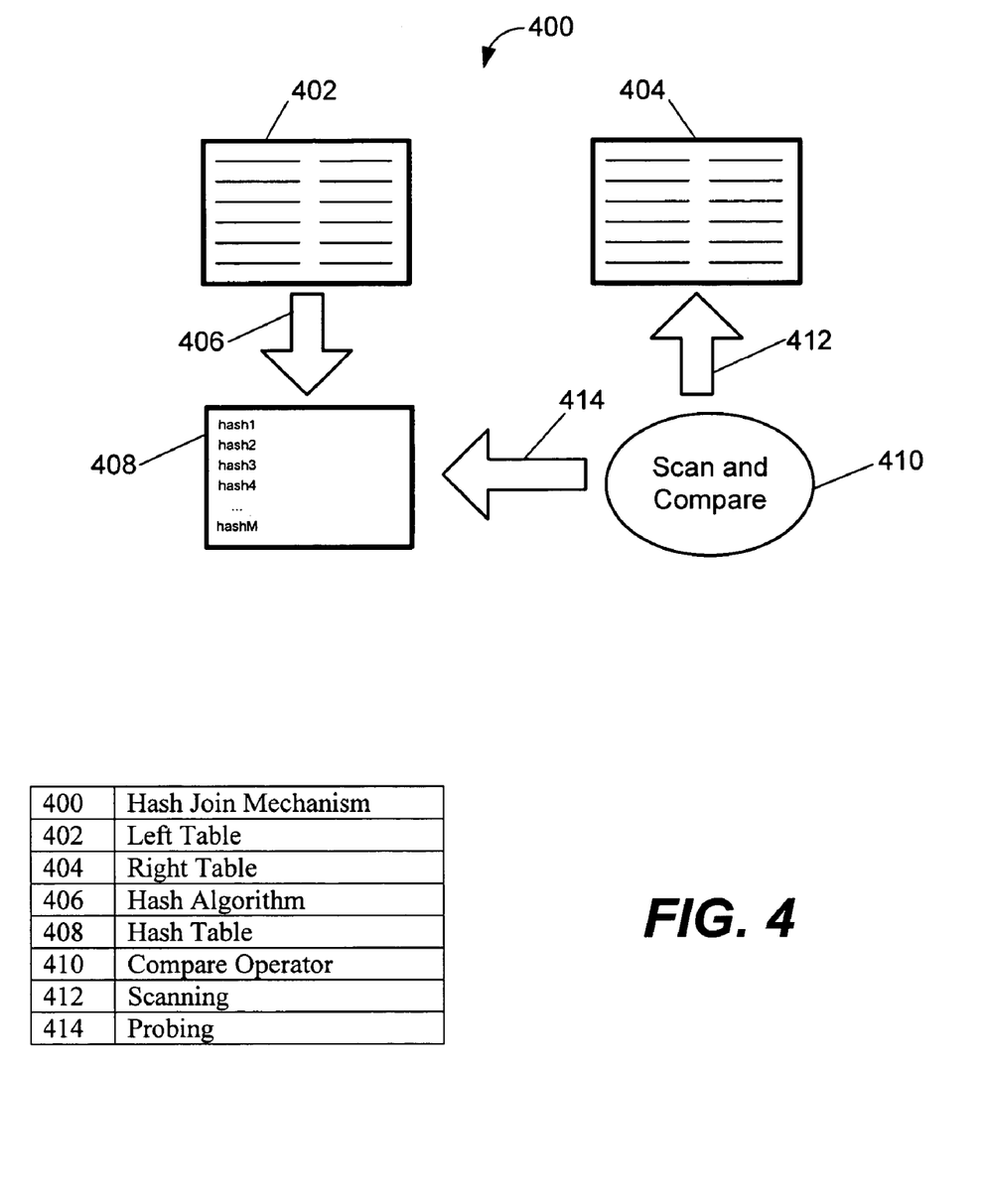
FIG. 4 is a block diagram illustrating a hash join.

The classical hash join mechanism is illustrated in FIG. 4. Specifically, the hash join mechanism 400 has an left table 402 and an right table 404. The left table 402 is put through a hash algorithm 406 to form hash table 408. There is a Scan and Compare operator 410 that scans 412, the right table 404, and compares (probes) the resulting hash value in operation 414 to the hash values in the hash table 408.

Figure 5:
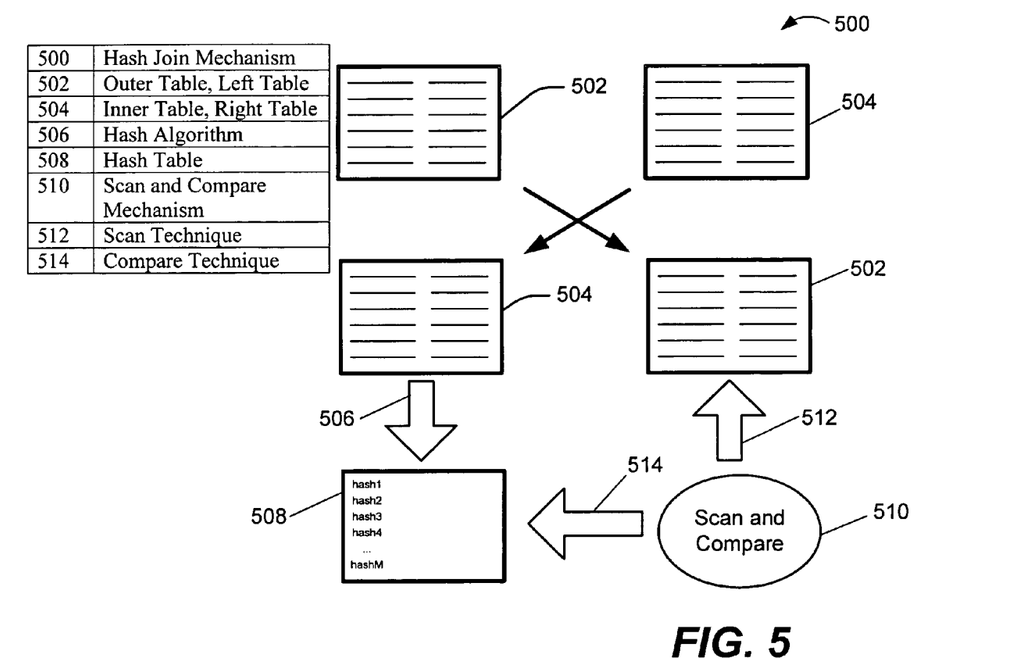
FIG. 5 is a block diagram illustrating an embodiment of the hash join of the present invention.

An embodiment of the present invention can utilize the classic hash join mechanism illustrated in FIG. 4. FIG. 5 illustrates how the table arrangement starts as before, with the outer table 502 and the inner table 504. In this embodiment of the present invention, however, the tables are transposed, as illustrated in FIG. 5, so that the inner table 504 is now the left table and the outer table 502 is now the right table. This transposition allows the tables to utilize the hash join algorithm illustrated in FIG. 4. Thus, the hash table 508 is created from left table 504 by hash algorithm 506 and the Scan and Compare mechanism 510 utilizes Scan technique 512 against the right table 502 and Compare technique 510 to determine whether or not the hash values satisfy the inclusion/exclusion condition, typically one row at a time. The technique illustrated in FIG. 5 offers the advantage of using the mechanism of the classic hash join illustrated in FIG. 4, with the only change necessary being the exchange of the inner and outer tables. While this technique is typically employed one row at a time, this technique is amenable to parallelization, with the process proceeding one row at a time per processor. Alternate embodiments are envisioned where special purpose modules are created that obviate the need to swap the inner and outer tables.

Figure 6:
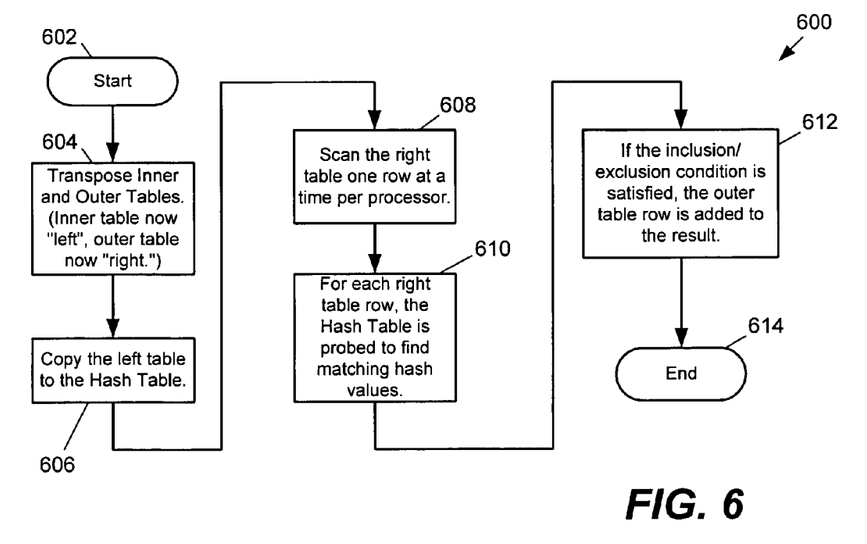
FIG. 6 is a flow chart illustrating the overall method of the present invention.

Attention is now directed to FIG. 6 which is a generalized flowchart of the method of the present invention. The method starts generally at Step 602. Thereafter, in Step 604, the outer table and the inner table are transposed (switched) so that the outer table is now the right table and the inner table is now the left table. Next, in step 606, the left table, be it a normal table or the result of a subquery, is copied to the hash table through the use of a hash algorithm or hashing function. Next, in Step 608, the right table is scanned, typically one row at a time per processor, and then in Step 610, for each row in the right table, the hash table is probed to find matching hash values. It should be noted that once one of the actual values in the hash table indicate satisfaction of an inclusion condition, then that outer table row, which is already on hand because it was used to create the hash value needed to probe the hash table, can be included in the join result file and, in the case of the inclusion join, all other processing for that left table row can stop immediately, thereby conserving resources. It should be emphasized again that while a hash match is a necessary condition, it in itself is not sufficient to ensure that inclusion is valid. Non-equivalent values can produce the same hash value. Consequently, once a hash match has been found, the actual values must be examined (in the join evaluation step) to determine whether or not the current row should be included in the result file. In the case of an exclusion join, once one of the actual values from a row from the right table matches a value in the hash table, then the exclusion condition is not satisfied for that row and further processing for that row may cease.

Figure 7:
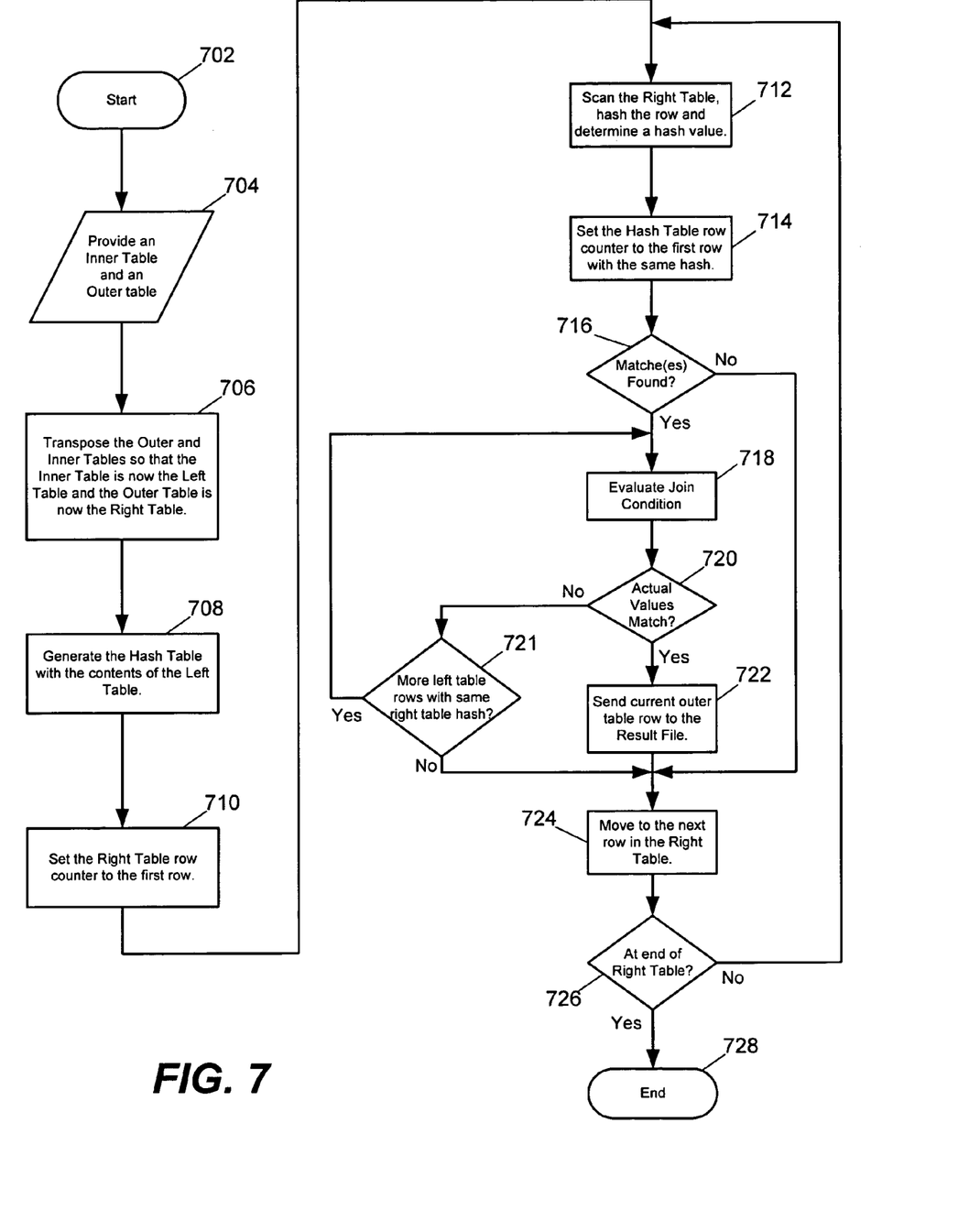
FIG. 7 is a flow chart illustrating an embodiment of the inclusion join method of present invention.

FIG. 7 illustrates an embodiment of the method of an inclusion join of the present invention. The method begins generally at Step 702. In Step 704, an inner table and an outer table are provided. Next, in Step 706, there is a transposition (swapping) of the outer table and the inner table so that the outer table is now the right table and the inner table is now the left table. In Step 708, a hash table is generated with the contents of the left table. In Step 710, the right table row counter is set to the first row. In step 712, a hash value is obtained from the current row of the right table either by scanning the actual values in order to calculate the hash value or simply by retrieving a pre-calculated hash value embedded in the row header. Next, in step 714, the hash table row counter is set to the first row that matches the hash value determined in step 712. A check is made to determine if the hash values match, step 716. If not, execution moves to step 724 where the current row is skipped and execution moves to the next row in the right table. Otherwise (i.e., there was a match found), then the join condition is evaluated (e.g., the actual values are compared) in step 718. In step 720, the actual values are examined to determine if the actual values match. If not, (i.e., the join condition is not satisfied) execution moves to step 721, where a check is made to determine if any more left table rows match the right table hash value. If so, then execution is moved back to step 718. Otherwise, processing on the current row of the right table ends so execution is moved to step 724. If the result of step 720 is positive, e.g., there is a match in the actual values (i.e., the join condition is satisfied), then current row of the outer table is appended to the result in step 722. A check is made in step 726 to determine if the end of the right table has been reached. If not, execution moves to step 712. Otherwise, the method ends at Step 728.

Figure 8:
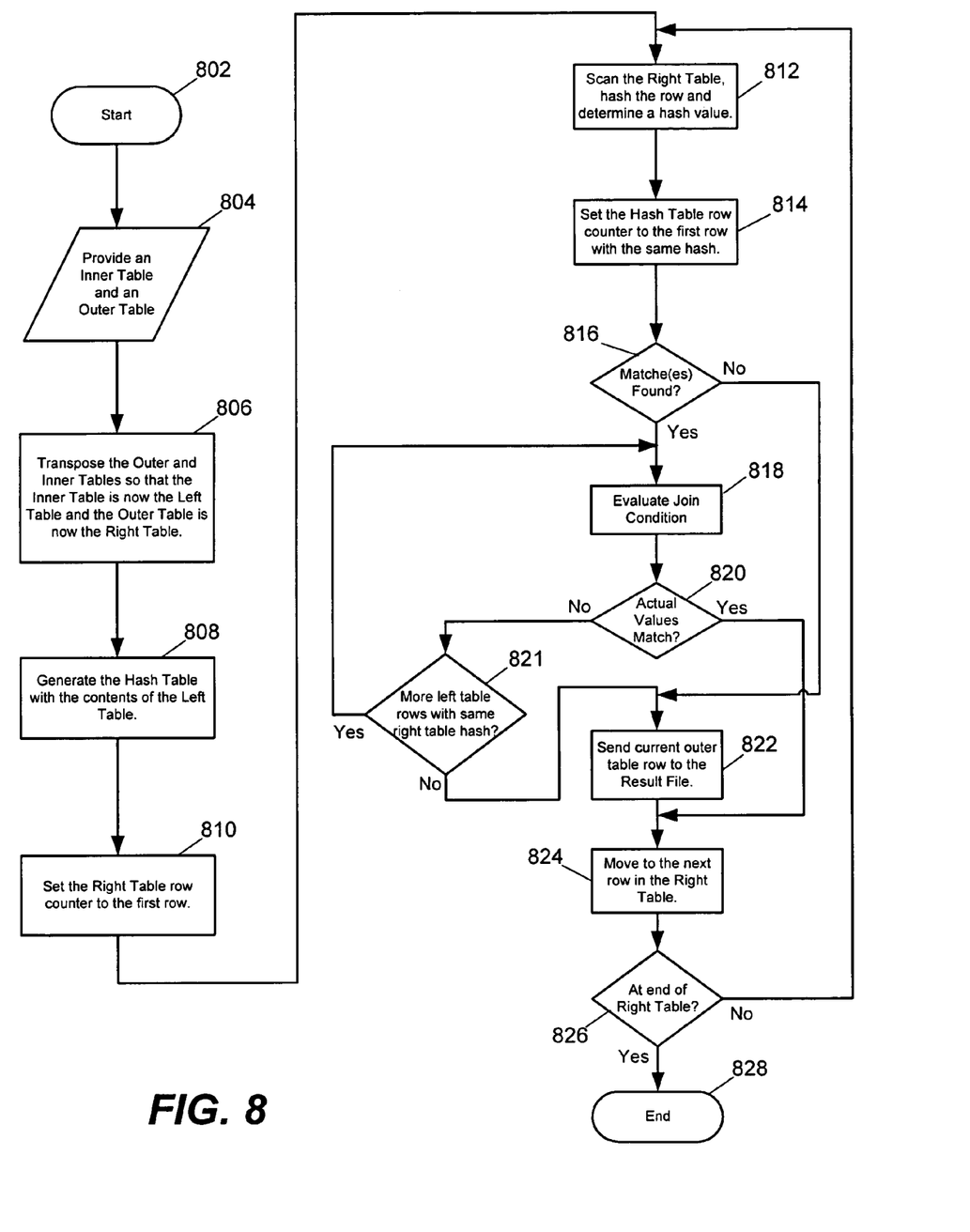
FIG. 8 is a flow chart illustrating an alternate embodiment of the exclusion join method of present invention.

FIG. 8 illustrates an exclusion join embodiment of the method of the present invention. The alternate embodiment begins at generally Step 802. In Step 804, an inner table and an outer table are provided. Next, in step 806, the inner table and outer table are transposed so that the outer table is now the right table and the inner table is now the left table. Thereafter, a hash table is generated with the contents of the left table in Step 808. Next, in Step 810, the row counter for the right table is moved to the first row. In step 812, a hash value is obtained from the current row of the right table either by scanning the actual values in order to calculate the hash value or simply by retrieving a pre-calculated hash value embedded in the row header. The hash table row counter is then set to the first row in the hash table that matches the hash value, step 814. In step 816, a check is made to determine if a match of hash values was found between the right table and the hash values of the left table. If no matches are found (i.e., "No"), then the exclusion condition is satisfied and the row can be added immediately to the result, preferably without the need for spooling, so execution can skip immediately to step 822. If matches were found, e.g., the result of step 816 is "Yes," then the actual values will have to be evaluated to determine if the join conditions have been satisfied in step 818. Next, in step 820, a check is made to determine if the actual values match. If so (meaning that the exclusion condition is not satisfied), then execution moves to step 824. Otherwise, execution moves to step 821, where a check is made to determine if there are other left table rows with the same right table hash value. If so, then execution moves back to step 818. Otherwise, the exclusion condition is satisfied for all left table rows and the right table row is included in the result table, preferably without spooling operations. Execution then moves to step 824 where the next row in the right table is addressed. A check is made in step 826 to determine whether or not the end of the right table has been reached. If not, execution is routed back to step 812 for further processing. Otherwise, the method ends at step 828. It should be noted that for either the inclusion or exclusion operations, the check, steps 824 and 826 (724 and 726) can be interchanged without penalty, as a matter of convenience.

Figure 9:
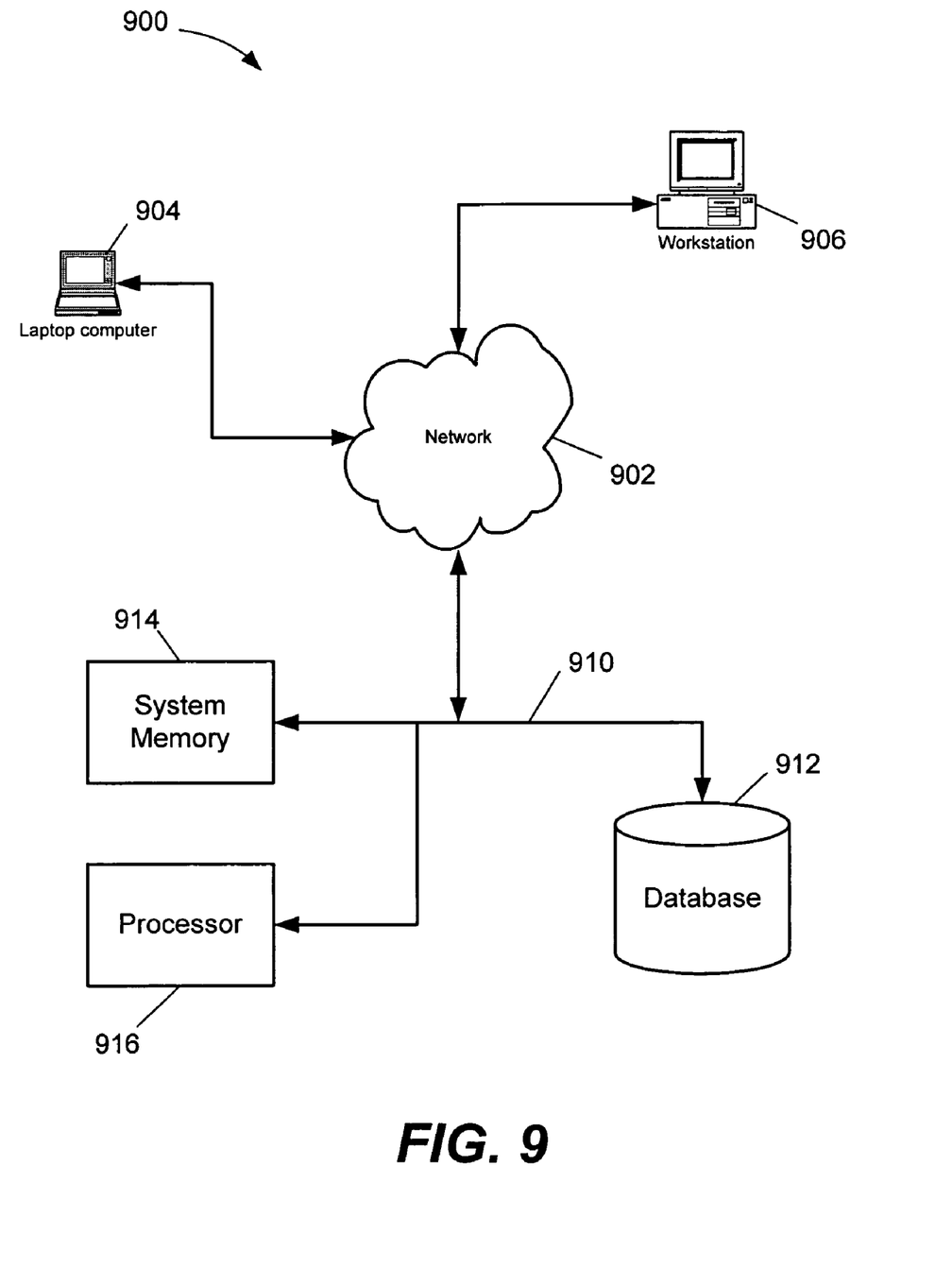
FIG. 9 is a block diagram of an alternate embodiment of the system of the present invention.

The method of the present invention can be implemented on a database system illustrated in FIG. 1 and FIG. 9. The database can have, typically, two tables for responding to SQL statements that designate an outer table and an inner table within the database. Alternatively, one physical table can be used and referenced twice, first as the outer table, and then again as the inner table. The database system itself consists of system memory that is capable of storing a hash table and perhaps other database-related parameters. As illustrated in FIG. 9, the database system 900 has at least one processor 916 that is operative with the system memory 914 and the database 912 via system bus 910. The processor is used to generate a hash table that can be stored in system memory 914 from the one of the tables designated in the SQL statement. The processor 912 is also used to scan the other table (which may be empty, e.g., have zero records) in order to generate an hash value that can then be compared the hash values in the hash table to determine whether or not an inclusion or an exclusion condition is satisfied. Those outer table rows satisfying the inclusion/exclusion condition are appended to a result that can be stored in either system memory 914, database 912, or transmitted to workstations 904 and 906 via network 902.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for joining an inner table and an outer table in a database in response to a query statement having an inclusion operator, said method comprising:
    (a) providing an inner table;
    (b) providing an outer table having zero or more records for inclusion with said inner table;
    (c) transposing said outer table and said inner table to form a right table and a left table, respectively;
    (d) creating a hash table from said left table;
    (e) obtaining a hash value from said right table;
    (f) probing said hash table with said hash value from said right table to determine if said hash value matches a value in said hash table;
    (g) concluding that said hash value from said right table matches said value in said hash table;
    (h) in response (i) evaluating the actual values and, (ii) concluding that the join condition is satisfied, and, in response, including said row of said right table in a result.

2. The method of claim 1, wherein probing said hash table is accomplished one row at a time per processor.

3. The method of claim 1, wherein said step of obtaining the hash value from said right table includes calculating the hash value.

4. The method of claim 1, wherein said step of obtaining the hash value from said right table includes retrieving a pre-calculated hash value from a row header.

5. A method for joining an inner table and an outer table in a database in response to a query statement having an exclusion operator, said method comprising:
(a) providing an inner table;
(b) providing an outer table having zero or more records for inclusion with said inner table;
(c) transposing said outer table and said inner table to form a right table and a left table, respectively;
(d) creating a hash table from said left table;
(e) obtaining a hash value from said right table;
(f) probing said hash table with said hash value from said right table to determine if said hash value matches a value in said hash table;
(g) concluding that said hash value from said right table does not match any value in said hash table, and, in response, including said row from said right table in a result.

6. The method of claim 5, wherein probing said hash table is accomplished one row at a time per processor.

7. The method of claim 5, wherein said step of obtaining the hash value from said right table includes calculating the hash value.

8. The method of claim 5, wherein said step of obtaining the hash value from said right table includes retrieving a pre-calculated hash value from a row header.

9. A database system having a database with at least two tables for responding to SQL statements having an inclusion join condition that designate an inner table and an outer table within said database, said database system comprising:
system memory, said system memory constructed and arranged to store a hash table;
a processor operative with said system memory, said processor constructed and arranged to:
a) transpose said outer table and said inner table to form a right table and a left table, respectively;
b) create a hash table from said left table;
c) obtain a hash value from said right table;
d) probe said hash table with said hash value from said right table to determine if said hash value matches a value in said hash table;
e) conclude that said hash value from said right table matches said value in said hash table;
f) in response (i) evaluate the actual values and, (ii) conclude that the join condition is satisfied, and, in response, include said row of said right table in a result.

10. A database system having a database with at least two tables for responding to SQL statements having an exclusion join condition that designate an inner table and an outer table within said database, said database system comprising:
system memory, said system memory constructed and arranged to store a hash table;
a processor operative with said system memory, said processor constructed and arranged to:
(a) transpose said outer table and said inner table to form a right table and a left table, respectively;
(b) create a hash table from said left table;
(c) obtain a hash value from said right table;
(d) probe said hash table with said hash value from said right table to determine if said hash value matches a value in said hash table;
(e) conclude that said hash value from said right table does not match any value in said hash table, and, in response, include said row from said right table in a result.

* * * * *